Patented Mar. 11, 1924.

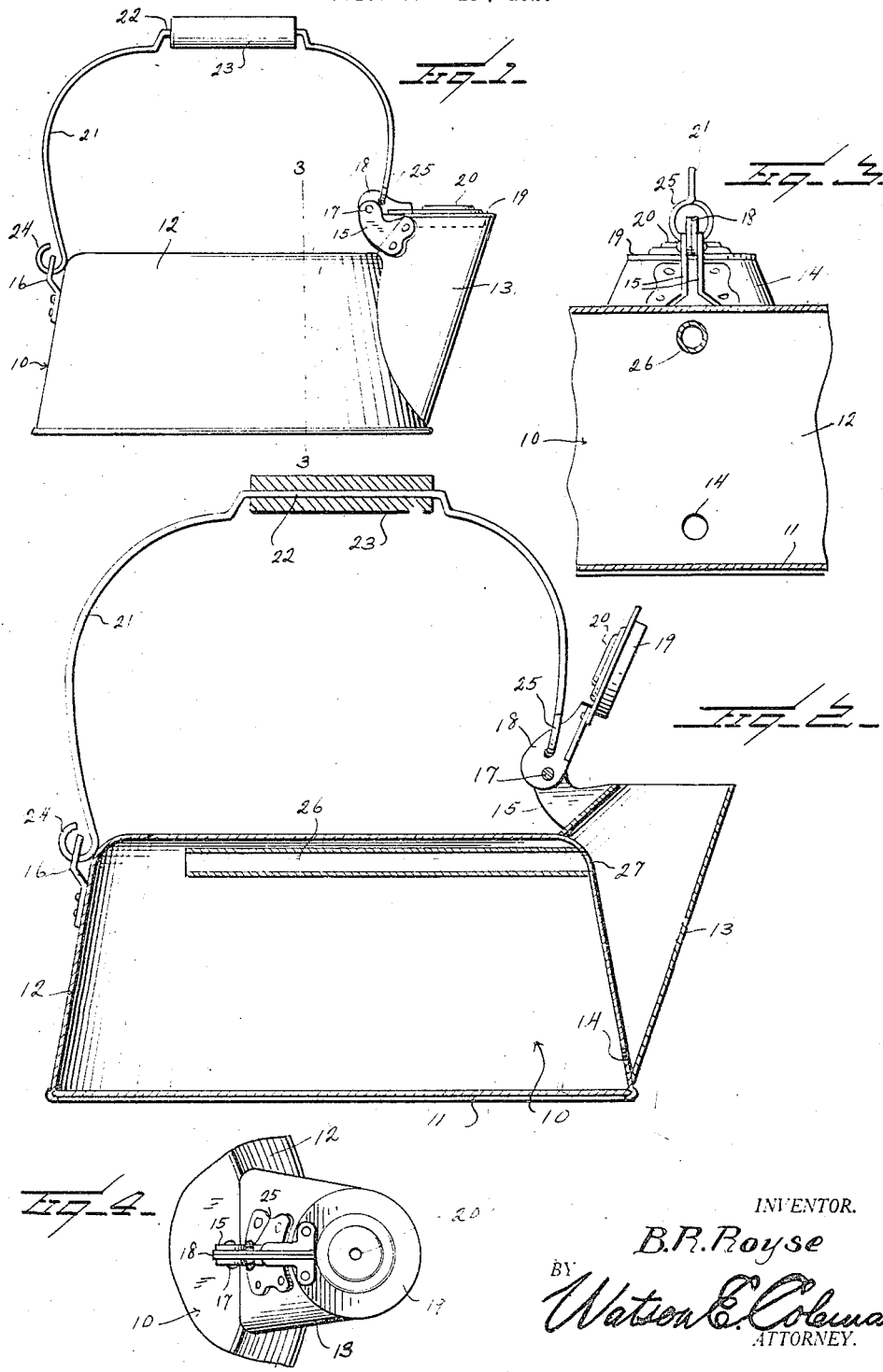

1,486,802

UNITED STATES PATENT OFFICE.

BENJAMIN R. ROYSE, OF DODGE CITY, KANSAS.

TEAKETTLE.

Application filed October 13, 1923. Serial No. 668,321.

*To all whom it may concern:*

Be it known that I, BENJAMIN R. ROYSE, a citizen of the United States, residing at Dodge City, in the county of Ford and State of Kansas, have invented certain new and useful Improvements in Teakettles, of which the following is a specification, reference being to the accompanying drawings.

This invention relates to cooking utensils, particularly to tea kettles, and has for its object the provision of a novel device of this character in which the usual lid is omitted so that dishes, either empty or containing food, may be heated upon the top, the arrangement being that filling is effected through the spout which is made comparatively large to facilitate this operation.

Another object is the provision of a kettle of this character in which the spout is provided with a cover which will be automatically opened when the device is lifted for the purpose of pouring out water, the cover being furthermore equipped with a whistle which will inform the operator that the water has reached the boiling point, the whistle being actuated by steam discharged therethrough.

Another object is the provision of a kettle of this character which will be simple and inexpensive to manufacture, easy to operate, efficient and durable in service, and a general improvement in the art.

With the above and other objects and advantages in view, the invention consists in the details of construction and arrangement of parts to be hereinafter more fully described and claimed, and illustrated in the accompanying drawing, in which:—

Figure 1 is a side elevation of a kettle constructed in accordance with the invention;

Figure 2 is a vertical section therethrough with the spout cover in open position;

Figure 3 is a fragmentary cross section on line 3—3 of Figure 2;

Figure 4 is a fragmentary plan view;

Referring more particularly to the drawings, I have shown the device as comprising a body 10 which might be constructed of several pieces but which is here illustrated as formed simply from two, namely a circular bottom 11 and an inverted shell or casing 12 secured to the periphery thereof. At one side there is provided a spout 13 which is secured in any desired manner to the shell 12 and which preferably extends upwardly to a point somewhat above the top of the kettle body. Communication is permitted between the kettle body and the spout through a hole 14.

Secured upon the projecting upper portion of the spout are brackets 15, and secured upon the kettle body at a diametrically opposite point is a somewhat similar bracket 16. Pivoted at 17 between the brackets 15 is an arm 18 carrying a cover 19 which normally fits upon and closes the open upper end of the spout. Within this cover is an ordinary whistle 20 for a purpose to be described.

The handle provided is designated by the numeral 21 and is formed as an ordinary bail having its intermediate portion off-set at 22 and carrying a wooden or other handle 23. At one end the bail is formed with an eye 24 engaged within the bracket 16, while the other end is formed with an eye 25 engaged within a suitable hole in the arm 18 at a point comparatively near the pivot 17.

Located within the top of the kettle body or shell 12 is a horizontally disposed pipe 26 which has one end terminating at the intermediate portion of the shell and which has its other end extending through or communicating with a hole 27 in that portion of the shell covered by the spout.

In use, it is to be noted that when the operator lifts the kettle by means of the handle the weight will cause the kettle to pull downwardly with respect to the handle, which results in swinging the arm 18 upwardly into the position shown in Figure 2, the cover 19 unseating so that water may be poured into the spout 13, from which it will flow through the hole 14 into the kettle proper.

When heat is applied and the water boils, the steam will escape through the pipe 26 and opening 27 into the spout and when passing through the whistle 20 will cause an audible sound which will inform the operator of the fact that the water is boiling. When pouring out the contents, it is apparent that the cover 19 is always automatically unseated or lifted when an upward strain is applied to the handle.

From the foregoing description and a study of the drawings, it will be apparent that I have thus provided a kettle which is entirely free from the objectionable cover or lid which, as is well known, frequently falls off when tilting the kettle to pour out the water and permits the steam to scald the hand of the operator. Furthermore, the flat top of the kettle proper may be used for heating dishes or for keeping food warm.

While I have shown and described the preferred embodiment of the invention, it is, of course, to be understood that the shape, size and number of pieces used in the construction may be varied within wide limits, and it is likewise true that any suitable material may be employed in the contruction. I furthermore reserve the right to make all such changes in the form and arrangement of parts as will not depart from the spirit of the invention or the scope of the subjoined claim.

I claim:—

A kettle comprising a shell-like body having a closed top, a spout on one side thereof having communication with the interior of the kettle through the body at the lower portion thereof, a steam escape pipe located entirely within the top of the body having one end about an opening formed in the side wall of the body and communicating with the spout whereby steam in the upper portion of the body may pass through the pipe and into the spout, said pipe extending diametrically of the body adjacent the top thereof and having its opposite end disposed adjacent the portion of the wall of the kettle remote from the spout whereby passage of water through the pipe to the spout upon tilting of the kettle is prevented.

In testimony whereof I hereunto affix my signature.

BENJAMIN R. ROYSE.